United States Patent [19]
Andrews et al.

[11] 3,715,941
[45] Feb. 13, 1973

[54] SLITTING MACHINE

[75] Inventors: Theodore E. Andrews, Kutztown; John J. Weller, Emmaus, both of Pa.

[73] Assignee: Armstrong Cork Company, Lancaster, Pa.

[22] Filed: Feb. 8, 1971

[21] Appl. No.: 113,342

[52] U.S. Cl. .............................83/7, 29/235, 83/9, 83/54, 83/180, 83/191
[51] Int. Cl. ..............................................B26d 3/08
[58] Field of Search ....83/7, 9, 54, 180, 191; 29/235, 29/453

[56] References Cited

UNITED STATES PATENTS

| | | | |
|---|---|---|---|
| 3,577,889 | 5/1971 | Eriksen | 83/54 X |
| 2,894,106 | 7/1959 | Jacob et al. | 83/62 |
| 2,923,194 | 2/1960 | Ambler et al. | 83/180 X |
| 3,059,515 | 10/1962 | Lindsey | 83/191 X |
| 3,499,210 | 3/1970 | Schellstede et al. | 29/453 X |

FOREIGN PATENTS OR APPLICATIONS

| | | | |
|---|---|---|---|
| 1,174,287 | 7/1964 | Germany | 83/191 |

*Primary Examiner*—Frank T. Yost
*Attorney*—Hopgood & Calimafde

[57] ABSTRACT

The invention contemplates a tool and method for slitting a tubular work piece having a bore of substantially constant cross-section. To this end, a slitting-tool holder is provided with work-piloting body or positioning elements so sized and configurated as to stabilize the holder in the bore of the work piece during a working traverse. One or more slitting-tool elements is positioned on the holder so as to project, in a work-slitting position, radially outwardly of the body element at one angular location (or at plural angularly spaced locations) with respect to the longitudinal axis of the work piece. The working traverse is accomplished with the slitting tool in cutting position, with assurance of perfect alignment through piloting derived from the bore of the work piece.

In a specifically described employment, two slitting-tool elements are arrayed to project outward of diametrically opposed locations, one element being adjusted to cut to less than work-piece thickness, the other being set to cut for greater than work-piece thickness. The work piece may thus become two hingedly related, substantially alike, elongated halves of the original tubing.

33 Claims, 8 Drawing Figures

PATENTED FEB 13 1973
3,715,941
SHEET 1 OF 2
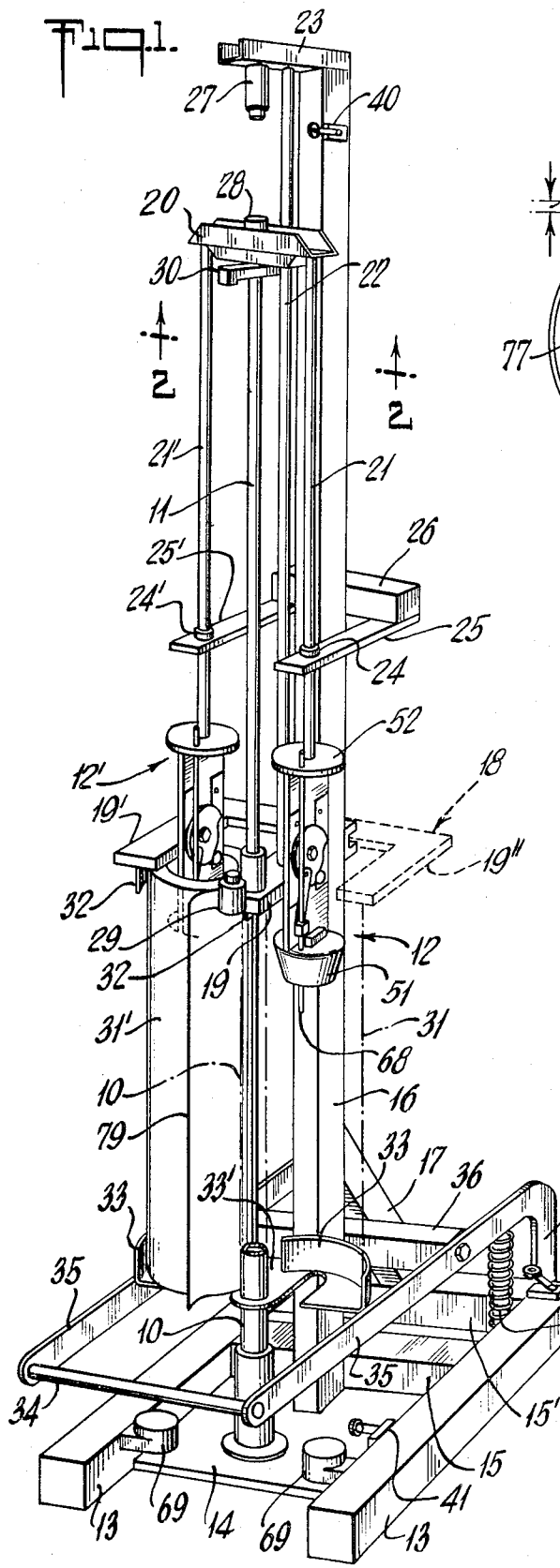
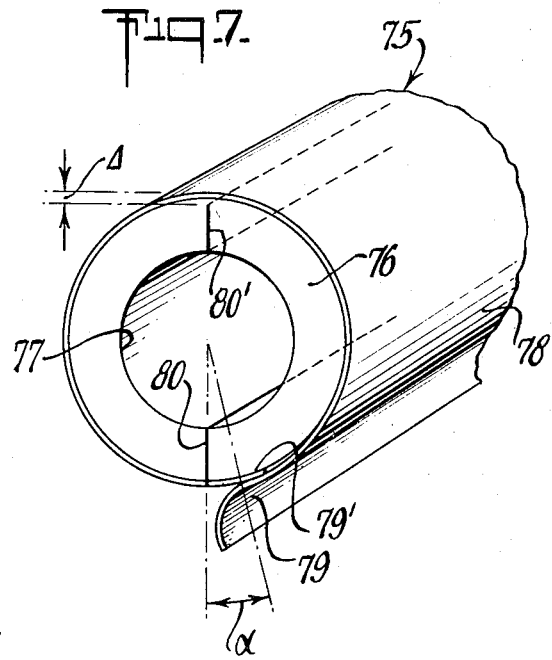
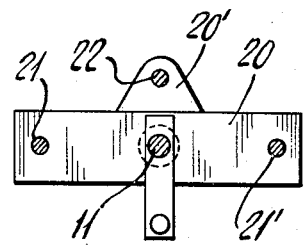
INVENTORS
THEODORE E. ANDREWS
JOHN J. WELLER
BY
Sandoe, Hopgood & Calimafde
ATTORNEYS

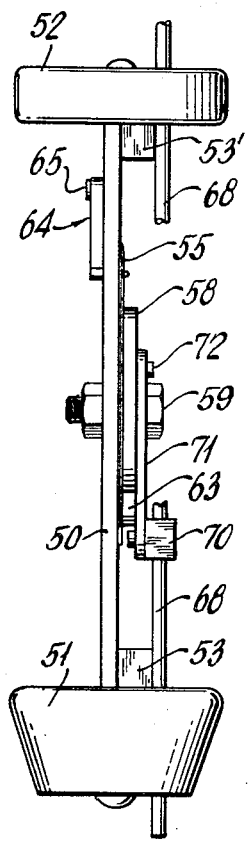
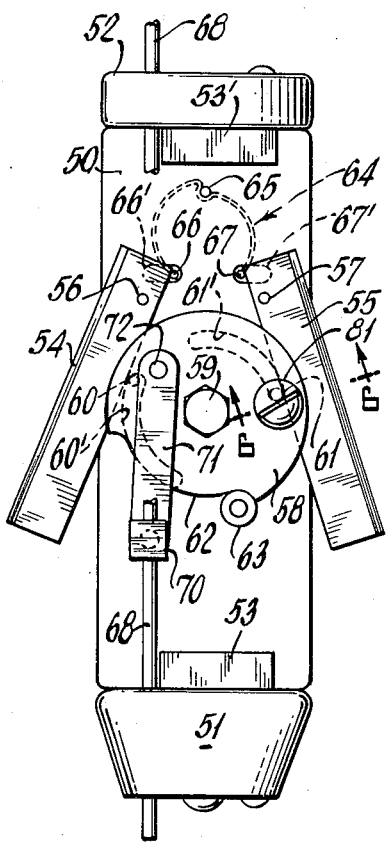
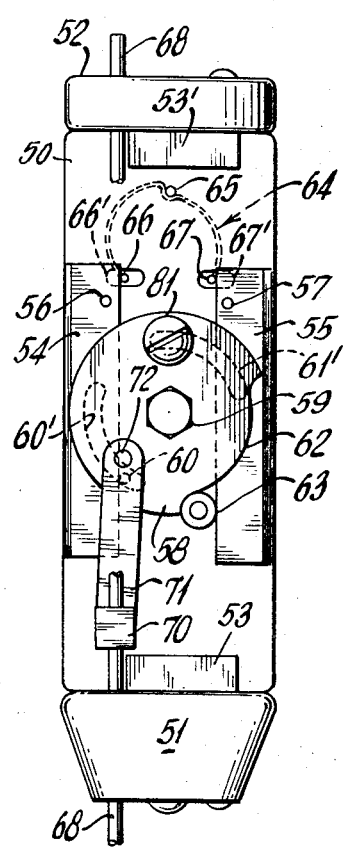
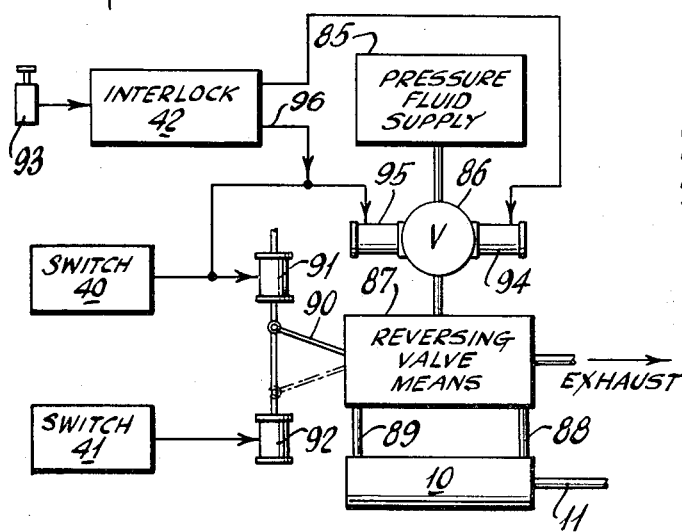
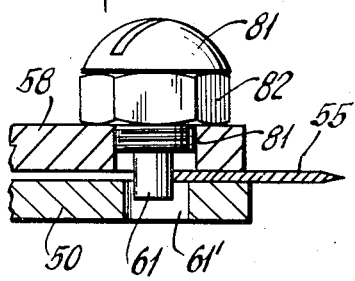

SLITTING MACHINE

This invention relates to apparatus and a method for producing one or more generally radial slits in a tubular work piece, such as a cut-off length of continuously produced foamed tubing of the nature described in copending Snelling, et al. patent application Ser. No. 69,661, filed Sept. 4, 1970.

Said patent application describes in general terms a product which is a circumferentially and longitudinally continuous tube of foamed plastic, such as urethane, the same having an inner lamination or lining (such as paper) and an outer lamination or envelope (such as paper, metallic foil laminated with paper, foil laminated with a tough flexible plastic such as polyethylene, etc.). Said product provides a highly effective heat-insulating jacket for pipe or conduit, and it must be longitudinally cut into substantially semi-cylindrical halves, for application to existing pipe or conduit. A prior technique of longitudinally sawing or slitting, using a single cutting element supported from outside the tubing, is less than satisfactory.

It is an object to provide an improved tool and method for slitting tubing of the character indicated.

Another object is to achieve the above object with a machine which lends itself to mass-production, producing superior slitting cuts in the hands of relatively unskilled operating personnel.

A specific object is to provide a machine of the character indicated which lends itself, with minimum down-time for set-up change, to precision slitting for a selected one of a relatively wide variety of sizes of tubing of the character indicated.

A further specific object is to provide such a machine wherein the radial cut of one slitting tool can be at a controlled radially outward extent, short of full thickness of the tubular work piece, while another slitting tool, concurrently operative at a different angular location, can sever the full thickness of the work piece, all without loss of stabilized reference to the bore wall of the work piece.

Another specific object is to sever a work-piece of the character indicated into segmental halves, and in a single working stroke, such that no tears or burrs are produced at the liner, such that offal is substantially zero, and such that an unsevered hinge of envelope material is left along one to the exclusion of the other of two opposed, radially outwardly operative, simultaneously performed slitting cuts.

It is a general object to achieve the foregoing at minimum cost, while maintaining maximum reliability and adherence to relatively close product tolerances.

Other objects and various further features of novelty and invention will be pointed out or will occur to those skilled in the art from a reading of the following specification in conjunction with the accompanying drawings. In said drawings, which show, for illustrative purposes only, a preferred embodiment of the invention:

FIG. 1 is a perspective view of a machine of the invention, shown partly broken-away and otherwise simplified, to reveal overall relationships of parts;

FIG. 2 is an enlarged, simplified sectional view at 2—2 in FIG. 1;

FIG. 3 is a view in elevation of a slitting-tool holder of the invention;

FIG. 4 is a left-side view of the tool holder of FIG. 3;

FIG. 5 is a view as in FIG. 3, but with certain parts in changed relation, to illustrate operation;

FIG. 6 is an enlarged sectional view at 6—6 in FIG. 3;

FIG. 7 is a fragmentary perspective view of the product of slitting, using the machine of FIGS. 1 to 6; and FIG. 8 is a simplified diagram to illustrate automatic operation of the tool of FIGS. 1 to 6.

Briefly stated, the invention in its presently preferred form utilizes tool-holder means which we term a shuttle, by reason of the fact that it is longitudinally reciprocated within the bore of the work piece, in a two-stroke cycle. Two slit-forming tools are carried by the shuttle; in the first stroke, both tools are retracted to enable the shuttle to pilot on the work-piece bore and thus correctly align the work piece. Between the first and second strokes, the tools are radially outwardly projected. Thus, both cuts are made on the return or second stroke.

Referring to FIG. 1, the invention is shown in application to an upstanding or vertical machine which relies upon double-acting pressure-fluid actuating means, such as an elongated fixed cylinder 10 and piston rod 11, to achieve the two-stroke reciprocating cycle of two like slitting-tool holders or shuttles 12—12'. The entire mechanism is carried by rugged frame means, comprising a base of parallel girders 13—13', united by a plate 14 and spacers 15—15'. An upright girder or standard 16 rises vertically from the base and is suitably braced, as at the tie 17 to the spacer 15'. At a generally central elevation, a rigid table 18 of generally E-shape is fixed to frame member 16 and includes a center arm 19, for secure location of the upper end of cylinder 10; the lower end of cylinder 10 is shown flanged, for secure central mounting to the base plate 14. A crosshead or slide 20, secured to the upper end of the actuating rod 11, spans the respective vertical-axis alignments of the two shuttles 12—12', to enable their parallel or tandem connection, by shuttle-drive rods 21—21'. To maintain alignment of the rods 21—21' throughout a cycle of actuation by means 10, the crosshead 20 includes a tail 20' (FIG. 2) slidably guided by a fixed rod 22; rod 22 constitutes elongated guide means, secured at its lower end to the table arm 19 and at its upper end to a bracket 23 at the top end of standard 16. Further fixed guide means includes slide bushings 24—24' on forwardly projecting arms 25—25' carried by a cross-member 26; bushings 24—24' stabilize alignment of the shuttle-drive rods 21—21' at a location sufficiently above table 18 to permit the shuttles 12—12' to clear table 18 at the upper end of the retracting stroke of the cycle. A dash-pot, shock-absorber or snubber 27 depends from bracket 23 and is aligned to intercept a crosshead abutment 28, to cushion the upper end of the return stroke of shuttle drive; similar snubber means 29 on table arm 19 cushions the lower end of the first or "down" stroke, upon crosshead abutment at 30, as will be understood.

The tandem shuttles 12—12' operate simultaneously on two work pieces which are removably mounted to the frame in parallel upstanding array, on opposite sides of the cylinder 10. For clarity, the near work piece 31 is shown in phantom outline, and only the other work piece 31' is shown in full lines. For work piece 31', the upper work-holding means may include suitable guide fingers 32 carried by table 18, beneath and around the closed end of the space between table arms 19—19', the fingers providing lightly yieldable engagement with diametrically spaced regions of the outer surface of work piece 31', in general axial alignment with the reciprocating axis of shuttle 12'; similar fingers (not shown) will be understood to be carried by table 18, beneath and around the closed end of the space between table arms 19—19'', for accommodation of work piece 31. The lower work-holding means is shown to include work-locating finger or skirt means 33 and a plate 33', on a pivoted frame which includes a forwardly positioned treadle bar 34 between spaced arms 35; arms 35 are pivoted to a fixed cross-arm 36 and are urged by tension-spring means 37 in the direction which loads the lower work-holding means in the upward direction, for firm fixed reference at table 18. A down-turned end of arm 35 provides a safety stop against the base cross member 15' to prevent excessive treadle elevation when no work pieces are in the machine.

Overall control will be later described, but it is helpful at this point to identify position-sensing devices or trips, for various control purposes. An upper limit switch or trip 40 is poised to detect the interfering presence of the crosshead tail 20' for termination of the return stroke. A lower limit switch or trip 41 is similarly poised to detect the interfering presence of the lower end of shuttle 12, for (a) termination of the downstroke and (b) reversal of drive connections for cylinder 10; such events occur after knife blades (on the shuttles) have cleared the lower end of the work piece, but at a shuttle location for which the upper piloting body (52) is still located in the bore of the work piece, as will later be more clear. A third limit switch or trip 42 detects proximity of the treadle part 38, preferably only after finger means 33 has properly engaged the work pieces and spring means 37 has raised the work pieces into sufficient overlap with the upper fingers 32; switch 42 serves an interlock function, to prevent premature initiation of the working stroke.

Referring to FIGS. 3 to 5, each shuttle 12 (12') is seen to comprise a flat elongated frame plate 50, connected to bore-piloting stabilizing means 51–52 at its lower and upper ends, respectively. Each of the means 51–52 is sized and configurated for close-clearance (i.e., sliding) contact with the bore profile of its work piece 31 (31'), the lower element 51 being of downwardly convergent taper, as shown, to more readily correct any work-piece misalignment that is encountered in the course of the downstroke; for the cylindrically annular work piece sections shown, the maximum peripheral contours at 51–52 are circular. Corner blocks or brackets 53—53' may be welded to frame plate 50 and may be tapped, for removably secured connection to bore-piloting means 51–52 of various sizes and profiles, depending upon the currently applicable work-piece bore.

In the form shown, each shuttle carries two slitting tools, which may be flat knife blades 54–55 independently pivoted near their upper ends (at 56–57) to the frame plate 50. Blades 54–55 are positioned in the same plane, through the central longitudinal axis of the shuttle. The radially outward longitudinal edges of the blades are ground for cutting duty, while their radially inner longitudinal edges are square-cut for a cam-following function to be explained.

A single crank means or plate 58 is pivotally supported at 59 on frame 50 and carries angularly spaced crank pins 60–61 for camming action upon the square-cut radially inner edges of the two knife blades 54—55. An arcuate relief 62 in the otherwise circular profile of plate 58 coacts with a stop or roller 63 carried by plate 50. The respective blades 54—55 are retained and radially supported between plates 50—58, and pins 60–61 project across this space, to pass with freedom within arcuate cut-outs or openings 60'—61' in plate 50, at least for the limited angular freedom of motion of plate 58, as determined by means 62–63. As shown, resilient means normally urges blades 54–55 toward the closed or retracted position (FIG. 5), but the cam or blade-actuating pins 60–61 in FIG. 3 are at their high points or maximum rise, with respect to the adjacent blade-follower edge; thus, the blades 54–55 are positively held in their outward position, against resilient loading, in what may be termed effectively and substantially the "dead-center" position of a toggle mechanism. The resilient action derives from a single wish-bone spring 64, centrally configurated for retention by a pin 65 on the back side of plate 50, i.e., on the side away from plate 58 and the knife blades. However, each of the free ends 66–67 of spring 64 is laterally offset, passing through local slot apertures 66'–67' in plate 50 and constantly engaging the heel ends of blades 54–55. It will be understood that, for the blades-out relation of FIG. 3, the angular preloaded compressional stress of spring 64 is such that ends 66–67 would displace away from each other, in the absence of restraint dictated by pin-to-blade engagements 60—54 and 61–55. In the blades-in relation of FIG. 5, spring action remains in the same direction but with reduced force, due to the more separated relation between blade heels.

In accordance with a feature of the invention, probe means carried by the shuttle is poised to strike frame-based limiting abutments at the end of each stroke to automatically actuate blades 54–55, from in to out at the bottom end of the "down" stroke, and from out to in at the upper end of the "up" or retracting stroke. For this purpose, we show a single elongated probe rod 68 slidably guided by aligned bores in pilot elements 51–52 and projecting therebeyond. Base abutments 69 are shown in FIG. 1, aligned to intercept rods 68 at the down end of the cycle, and similar engagement of the upper projecting ends of rods 68 will be understood to occur at the undersides of frame arms 25—25'. A pin block 70 secured to rod 68 is shown connected, via link 71 and at pin 72, to the crank plate 58.

In operation, when rod 68 strikes base abutment 69 just before completing the downstroke, its arrest (coupled with ensuing incremental completing downstroke displacement) is effective to dislodge rod 68 from its blade-retracting (FIG. 5) relation, and to shift the same and crank plate 58 to the tangent-like cammed outward blade-positioning relation of FIG. 3, wherein pins 60–61 engage their blades at the peak of the cam rise. This relation holds throughout the return or "up" stroke, as both blades perform their cutting function. Upon approach to the end of the "up" stroke, the upper ends of rods 68 are intercepted by the bottoms of arms 25—25'; such arrest (coupled with ensuing incremental upstroke displacement, to completion) is effective to dislodge rod 68 from its blade-extending (FIG. 3) relation, and to shift the same and crank plate 58 back to the blade-retracting relation of FIG. 5.

FIG. 6 illustrates a product of the described slitting operation. Initially the elongated tubular length 75 is as formed by the machine and process of said Snelling et al. patent application, namely, a laminated conduit wherein circumferentially and longitudinally continuous foamed urethane or the like 76 uniformly defines an insulating annulus between an inner paper or the like liner 77 and an outer paper or the like sheath 78, which may be foil-laminated with a residual unadhered elongated flap 79. The length 75 will be appropriate to the effective span between work-holding means 32—33, and the flap 79 is angularly positioned such that the more extended knife blade 54 will develop the slit 80, close to but angularly offset (to the extent α) from and within the flap and its point of bonded overlap to its other edge 79'; the effective free extent of flap 79 should exceed the extent α, being preferably in the order of 2α. It will be understood that simple means such as a wire bail (not shown) may be carried by the table arm 19 and/or by other frame-based means to engage under flap 79 so as to hold the same clear of blade 54 during the cutting stroke thereof. The other blade 55 is set (when extended) to cut radially clear of marring contact with the outer layer 78, as suggested by the symbol Δ in FIG. 6, to identify the limited penetration of slit 80' available to blade 55. In order to achieve precision in initial establishment of the clearance Δ, we show adjustable means for the selective radial positioning of the actuating pin 61 for blade 55. As shown, pin 61 is an eccentrically offset stud at the end of a threaded element or bolt 81, the plate 58 being tapped to receive bolt 81, and a lock nut 82 being exposed to secure a selected angular position of pin 61 with respect to the bolt axis (and, hence, a selected limiting radial "high-rise"blade-lifting position, for motion about the rotary axis of plate 58). In an illustrative embodiment, wherein the conduit bore 77 is about 3-inches diameter, the adjustable eccentric throw at 61 enables a range of about ⅛-inch for radial selection of high-point contact to hold blade 55 in cutting position; in terms of the outer limit of cut by blade 55 in slit 80, i.e., at the blade corner 82 (FIG. 3), this means about a ½-inch range of precision adjustment.

FIG. 7 is a very simplified diagram to illustrate automatic operation of the invention for each two-stroke cycle. A pressure-fluid supply 85, as of compressed air, is connected to cylinder 10 via a solenoid operated on-off valve 86 and via reversing distribution-valve means 87 having separate output connections 88–89 to the tail and head ends of cylinder 10. Means 87 includes a solenoid-positioned actuating arm 90, the same being actuated up (as shown) when solenoid 91 is energized, and to the down or reversing position when solenoid 92 is energized; actuation of switch 40 determines an energizing supply to solenoid 91, while actuation of switch 41 similarly controls solenoid 92. The cycle is started by push-button means 93 in series with interlock 42 to the valve-opening solenoid 94 of valve 86, thereby admitting pressure fluid at 88 to the tail of cylinder 10, for a "downstroke", until switch 41 is actuated and member 90 is shifted to its down position, thus reversing the action at cylinder 10 and automatically initiating the "up" or cutting stroke or rod 11; it will be recalled that, at reversal by contact at switch 41, the shuttles sufficiently clear the work pieces to allow blade projection while the upper piloting means 52 holds registry with the bores of the work pieces. The "up" stroke ends upon action of switch 40, which (a) resets actuator 90 to the up position (in readiness for the next down stroke) and (b) energizes the valve-closing solenoid 95 of valve 86, thus shutting down the machine to permit work-piece removal. If by some chance, the shuttle should foul a work piece during the downstroke, treadle frame 35 will be displaced to overcome spring action at 37, thus opening the interlock 42; the line 96 will be understood to suggest a back contact on interlock 42 so that a valve shut-off action at 95 may be immediately effective to terminate the downstroke in this eventuality.

The described embodiment will be seen to have achieved all stated objects. In use, the apparatus is precise, quick and efficient, producing no waste matter, and repeatedly adhering to a close tolerance setting at Δ. Blade removal is a simple matter, because all operating parts are exposed when shuttles are clear of work pieces. Adaptation to different bore sizes involves mere substitution of bore-piloting members 51–52, and adaptation to different foamed-wall thicknesses involves mere substitution of blades 54–55, as appropriate.

While the invention has been described in detail for the preferred form shown, it will be understood that modifications may be made without departing from the invention.

What is claimed is:

1. A slitting machine, comprising frame means including means for removably supporting an elongated tubular work piece with its elongation axis fixedly oriented, a shuttle including work-piloting means sized and configured to stabilize the shuttle in the bore of the work piece, reciprocable actuating means acting between said frame means and said shuttle for imparting to said shuttle a two-stroke cycle of longitudinal traverse in the bore of the work piece, radially retractable and extensible cutting means carried by said shuttle, and means synchronizing the radial position of said cutting means with said cycle such that in one of said strokes said cutting means is in a retracted position and in the other of said strokes said cutting means is in an extended position.

2. The machine of claim 1, in which said cutting means comprises first and second cutters each of which is radially retractable and extensible, said cutters being carried at angularly spaced locations with respect to the shuttle axis.

3. The machine of claim 2, in which said cutters are at substantially diametrically opposed locations.

4. The machine of claim 2, in which said synchronizing means establishes extended positions of both cutters in said one stroke and retracted positions of both cutters in the other of said strokes.

5. The machine of claim 1, in which said cutting means is a knife blade, carried by said shuttle for pivoted movement in substantially a radial plane through the shuttle axis.

6. The machine of claim 1, in which said synchronizing means comprises an elongated probe carried by said shuttle on an axis generally parallel to the shuttle axis and having limited longitudinally guided movement with respect to said shuttle, first and second frame-based abutment means at the respective ends of the cycle of shuttle movement and positioned to intercept the respective ends of said probe just prior to reaching the end of each stroke, and actuating means responsive to abutment-operated probe displacement for shifting said cutting means from one to the other of its retracted and extended positions.

7. The machine of claim 6, in which said last-defined means includes a toggle mechanism for which abutment-driven probe displacement is at least adequate to achieve a dead-center position at the end of both said strokes, whereby toggle mechanism is operative to hold the shifted position of said probe until the next reversing abutment interception thereof.

8. The machine of claim 6, in which said actuating means includes crank means pivotally carried by said shuttle, means linking said probe to said crank means, whereby limited longitudinal shuttling displacement of said probe with respect to said shuttle is converted into similarly limited rotary displacement of said crank means, and an actuating connection between said crank means and said cutting means.

9. The machine of claim 8, in which said cutting means comprises first and second cutters having actuating connection to generally diametrically opposed points on said plate.

10. The machine of claim 9, in which cutters are knife blades independently pivotally carried by said shuttle, preloaded resilient means biased to urge said blades to retracted position, and cam means coacting between said plate and blades upon plate rotation for outwardly displacing said blades against the loading of said resilient means.

11. The machine of claim 10, in which said cam means is characterized by a high rise point substantially at the fully outwardly actuated positioning of said blades, whereby said blades are positively held outwardly for the full cutting stroke and until probe-abutment interception at the end thereof.

12. The machine of claim 11, in which said cam means comprises diametrically opposed pins carried by said plate and riding the radially inner edges of the respective blades, said blades being positioned at opposed acute angles to the shuttle axis when in extended position.

13. The machine of claim 12, in which at least one of said pins includes a radially adjustable connection to said plate.

14. The machine of claim 13, in which said one pin is an eccentric formation at the end of a member having threaded engagement with part of said plate, and locking means for securing a selected position of said threaded engagement.

15. The machine of claim 1, in which said shuttle is elongated and includes two longitudinally spaced work-piloting means, said cutting means being intermediate said two work-piloting means.

16. The machine of claim 15, in which said reciprocable actuating means includes an elongated member connected to said shuttle at one of said work-piloting means, the other of said work-piloting means having a convergent tapering profile for smooth and work-aligning entering engagement with the work piece.

17. The machine of claim 15, in which said reciprocable actuating means includes an elongated member connected to one end of said shuttle, and frame-based guide means for elongated member, said guide means being positioned close to said shuttle when at the end of the cutting stroke thereof, whereby other stroke is utilized for assuring work alignment with the path of shuttle displacement, based on the closest work-positioning frame reference at shuttle entry into he work piece.

18. The machine of claim 1, in which said reciprocable actuating means includes an elongated member connected at one end to said shuttle, a slide connected to the other end of said elongated member, and frame-based elongated guide means for said slide establishing a guided reference for said slide through the cycle of shuttle reciprocation.

19. The machine of claim 1, in which said means for removably supporting the work piece comprises a fixed work-piece end support and a movable work-piece end support spaced for engagement with the respective ends of the work piece, said fixed end support being located at the end of the cutting stroke of said shuttle.

20. The machine of claim 1, in which said reciprocable actuating means includes double-acting fluid-pressure operated means, and reversing control means for said double-acting means including a frame-based trip element positioned to detect achievement of that terminal extent of said first stroke which assures that said synchronizing means has been operative to shift the position of said cutting means.

21. The machine of claim 20, in which said reversing control is operative at the end of the non-cutting stroke.

22. The machine of claim 1, in which said supporting means positions two like work-pieces in side-by-side parallel relation, said shuttle being one of two which respectively serve the two work pieces, said actuating means including a crosshead spanning the respective axes of support of the work pieces, and separate elongated members connecting the respective shuttles to spaced parts of said crosshead.

23. The machine of claim 22, including frame-based elongated guide means for said crosshead.

24. The machine of claim 1, in which said supporting means orients the work piece on a vertical axis, and said actuating means includes a vertically reciprocable connection to said shuttle.

25. In a slitting machine, means for removably engaging an elongated tubular work piece to be longitudinally slitted, a slitting-tool holder including work-piloting means sized and configured to stabilize said holder in the bore of the work piece, reciprocable actuating means including elongated guide means between said tool holder and said work-engaging means for imparting relative movement between said tool holder and said work-engaging means in a two-stroke cycle of relative traverse of the tool holder in the bore of the work piece, radially retractable and extensible cutting means carried by said work holder, and means synchronizing the radial position of said cutting means with said cycle such that in one of said strokes to the exclusion of the other said cutting means is in a relatively extended position.

26. The machine of claim 25, including a frame to which said elongated guide means is fixedly referenced.

27. The machine of claim 26, in which said work-engaging means is carried by said frame and said tool holder is reciprocated.

28. The method of slitting a tubular work piece having a bore of substantially constant cross-section, which comprises selecting a slitting-tool holder with a work-piloting body element sized and configured to stabilize the holder in the bore of the work piece, selecting and mounting slitting-tool elements on the holder in such manner as to project in a work-slitting position radially outwardly of the body element at each of two angularly spaced locations with respect to the longitudinal axis of the work piece, traversing the tool-holder and work piece in one direction with respect to each other while the tool elements are in the work-slitting position, and traversing the tool-holder and work piece in the opposite direction with the tool elements radially retracted from said position.

29. The method of claim 28, in which the number of slitting-tool elements is two, the same being positioned with work-slitting alignments which are in substantially a single plane through said axis.

30. The method of claim 28, in which the number of slitting-tool elements is two, each of said tools being positioned with its work-slitting alignment in a plane which extends generally radially with respect to said axis.

31. The method of claim 28, in which one of the slitting-tool elements in its work-slitting position is set to project radially outwardly of the body element to an extent exceeding the thickness of the work piece, and in which another of the slitting-tool elements in its work-slitting position is set to project radially outwardly of the body element to an extent less than the thickness of the work piece.

32. The method of claim 31, in which the work piece is selected as a tube of foamed frangible material with a circumferential envelope of flexible material, whereby upon completion of a working traverse the work piece may become two hinged elongated segments hingedly connected by said flexible material on substantially the alignment of the second-mentioned slitting-tool element.

33. The method of slitting a tubular work piece having a bore of substantially constant cross-section, which comprises selecting a slitting-tool holder with a work-piloting body element sized and configured to stabilize the holder in the bore of the work piece, selecting and retractably mounting a slitting-tool element on the holder in such a manner as to project in a work-slitting position radially outwardly of the body element at a predetermined angular location with respect to the longitudinal axis of the work piece, traversing the tool-holder and work piece in one direction with respect to each other while the tool element is in work-slitting position at said angular location, and traversing the tool-holder and work piece in the opposite direction with the tool-element radially retracted from said position at said angular location.

* * * * *